United States Patent
Barbosa et al.

(10) Patent No.: US 11,341,367 B1
(45) Date of Patent: May 24, 2022

(54) SYNTHETIC TRAINING DATA GENERATION FOR MACHINE LEARNING

(71) Applicant: Amazon Technologies, Inc., Seattle, WA (US)

(72) Inventors: Renato Diogo Marangoni Barbosa, Sao Paulo (BR); Renato Garcia Pedigoni, Sao Paulo (BR)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 16/369,433

(22) Filed: Mar. 29, 2019

(51) Int. Cl.
*G06K 9/62* (2022.01)
*G06N 20/00* (2019.01)
*G06N 5/04* (2006.01)
*H04L 67/00* (2022.01)
*H04L 67/51* (2022.01)

(52) U.S. Cl.
CPC ......... *G06K 9/6257* (2013.01); *G06K 9/6279* (2013.01); *G06N 5/04* (2013.01); *G06N 20/00* (2019.01); *H04L 67/16* (2013.01); *H04L 67/34* (2013.01); *G06V 2201/10* (2022.01)

(58) Field of Classification Search
CPC .............. G06K 9/6257; G06K 9/6279; G06K 2209/27; H04L 67/16; H04L 67/34; G06N 5/04; G06N 20/00
See application file for complete search history.

(56) References Cited

U.S. PATENT DOCUMENTS

| 10,062,173 | B1 * | 8/2018 | Padfield | G06K 9/6255 |
| 10,540,798 | B1 * | 1/2020 | Walters | G06T 11/001 |
| 2018/0047192 | A1 * | 2/2018 | Kristal | G06Q 30/0643 |
| 2018/0345496 | A1 * | 12/2018 | Li | G06T 17/00 |
| 2018/0373999 | A1 * | 12/2018 | Xu | G06K 9/00765 |
| 2019/0213443 | A1 * | 7/2019 | Cunningham | G06K 9/78 |
| 2019/0251401 | A1 * | 8/2019 | Shechtman | G06T 11/00 |
| 2019/0266442 | A1 * | 8/2019 | Malur Srinivasan | G06K 9/6273 |
| 2019/0286950 | A1 * | 9/2019 | Kiapour | G06K 9/4628 |
| 2019/0340649 | A1 * | 11/2019 | Ayush | G06Q 30/0261 |
| 2020/0118315 | A1 * | 4/2020 | Ranzinger | G06F 16/56 |
| 2021/0042663 | A1 * | 2/2021 | Agustin | G06T 7/11 |

* cited by examiner

*Primary Examiner* — Nay A Maung
*Assistant Examiner* — Jose M Torres
(74) *Attorney, Agent, or Firm* — Nicholson De Vos Webster & Elliott LLP

(57) ABSTRACT

Techniques for synthetic training data generation for machine learning are described. A user provides a synthetic training data generator with first set of images and a corresponding set of class identifiers each indicating a type of object depicted in a corresponding image. Each image depicts an object with a substantially or completely monochromatic or transparent background. A user also provides or identifies a second set of images to be used as backgrounds. The synthetic training data generator generates a plurality of images by overlaying one or more of the objects depicted in the first set of images over ones of the second set of images, and further generates labels for each of the plurality of images. The plurality of images and labels are used to automatically train and deploy a machine learning (ML) model.

20 Claims, 10 Drawing Sheets

US 11,341,367 B1

SYNTHETIC TRAINING DATA GENERATION FOR MACHINE LEARNING

BACKGROUND

The field of machine learning (ML) has become widely acknowledged as a likely significant driver of the future of technology. Organizations everywhere now seek to use ML techniques to address a wide variety of problems, such as optimizing aspects of their products, processes, customer experience, etc. While the high-level view of ML sounds simple—e.g., provide training data to a computer, to allow the computer to automatically learn from the training data to generate a model that can make predictions for other data—implementing ML techniques in practice can be tremendously difficult.

This difficulty is partially due to the underlying algorithmic and mathematical complexities of ML algorithms, which are typically developed by academic researchers or individuals at the forefront of the field. Additionally, it is also difficult to generate, update, and deploy useful ML models, which can be extremely time and resource consumptive and filled with complexities. Moreover, ML models tend to be extremely focused on particular use cases and operating environments, and thus any change to the underlying environment or use case may require a complete regeneration of a new model. Further, constructing and deploying ML technologies is quite different from traditional software engineering, and requires practices and architectures different from what traditional software engineering development teams are familiar with. For example, a substantial amount of high-quality labeled training data is typically required to sufficiently train a ML model, which is very difficult and time-consuming to obtain.

BRIEF DESCRIPTION OF DRAWINGS

Various embodiments in accordance with the present disclosure will be described with reference to the drawings, in which.

DETAILED DESCRIPTION

Figure 1:
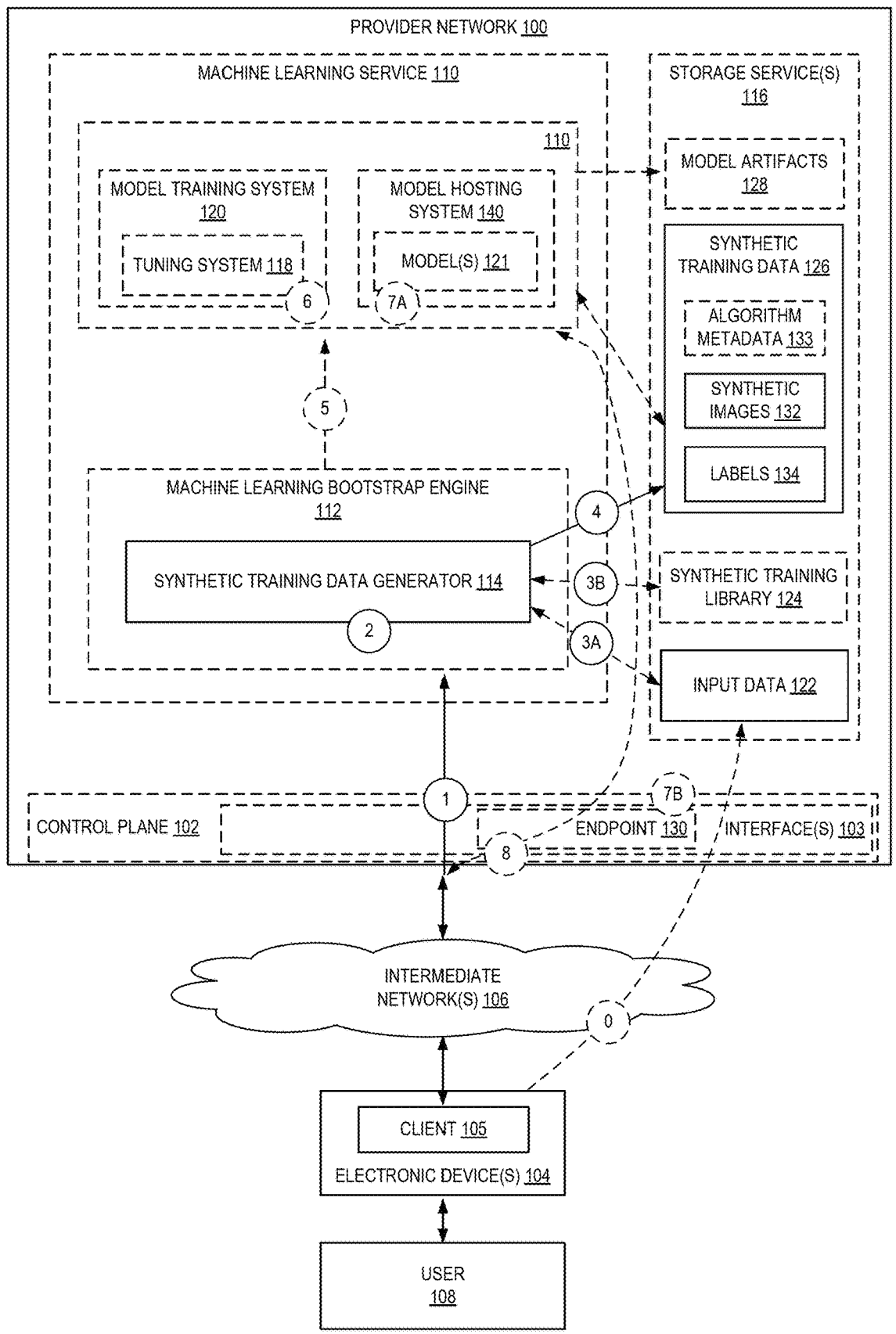
FIG. 1 is a diagram illustrating an environment for synthetic training data generation for machine learning according to some embodiments.

Various embodiments of methods, apparatus, systems, and non-transitory computer-readable storage media for synthetic training data generation for machine learning are described. According to some embodiments, a synthetic training data generator generates customized synthetic images for use in training machine learning models, e.g., to perform object detection, image classification, etc. Users may provide the synthetic training data generator with a set of images depicting objects sought to be detected, classified, etc., which can be used together with background images (provided or identified by the user, provided by the synthetic training data generator itself, etc.) to generate new, synthetic images that are particularly useful for training machine learning models customized for user-specific purposes. When implemented in a provider network, the synthetic training data generator may be utilized by users to create significant amounts of custom training data that can then be used—perhaps automatically—to train (or retrain) a machine learning model, which may similarly be automatically deployed behind an endpoint to generate inferences for subsequent inference requests.

In machine learning, having a sufficient number of annotated examples to learn from is one the key factors needed for successfully training a model. As one example, if there is a need to train a model to detect the existence of an animal such as a cat or horse depicted within an image, someone needs to first obtain many different example images including cats and horses, which is not a simple task. Further, this person must then also label these images with identifiers of what is depicted in each image (e.g., "cat" or "horse"), typically along with location information identifying where in each image the particular animal or animals are located.

This data collection and labeling process is thus often an extremely cumbersome task requiring significant amounts of time and resources, which may limit the ability of many users from being able to make use of machine learning techniques. For example, labeling may be done be people referred to as annotators, who manually label images or other types of data to be used for training models. However, such human annotations of data (e.g., identifying and transcribing text, along with associated location information, for each of a very large number of data elements) takes a long time and is extremely prone to errors, resulting in a long process for generating a model, only to generate a model of poor quality due to being trained on erroneous or low-quality annotated data. Moreover, this process may be very expensive and out-of-reach for many software developers.

Accordingly, in some embodiments a synthetic training data generator generates high-quality synthetic training data by merging images from a set of background images with images from a set of user-provided or user-specified images (depicting objects of interest). For example, the synthetic training data generator may overlay one or multiple ones of the object-depicting images—which may have been modified, such as via one or more of resizing, rotating, filtering (e.g., via "softness" or "blur" filters, color filters, etc.)—over ones of the background images (which similarly may have been modified, e.g., via applying filters) to create the new synthetic image set. By picking different combinations of images, placing object images in different locations and/or with different transformations, etc., the synthetic training data generator may thus generate many variations of images including the desired objects, which is tremendously helpful for training machine learning models. Further, the synthetic training data generator may also automatically generate labels for these generated images, e.g., that identify where in the generated images an object has been placed, together with a class identifier of each object. This results in extremely accurate labels (e.g., by removing humans—and thus human error—from the labeling process, by using extremely precise knowledge of the locations of object image overlaid in the synthetic images, etc.) that can be quickly generated.

The generation of these images and labels, in some embodiments, can be performed very rapidly though the use of parallelization as multiple agents (e.g., multiple software agents executed by potentially many compute instances, such as through an on-demand code execution service) can work toward a same goal. Thus, hundreds, thousands, tens-of-thousands or more images can be rapidly generated (e.g., in a few minutes or less), allowing for model training very quickly after the synthetic images generated process is initiated.

Thus, the generated synthetic images, along with the corresponding labels, may then be used to train a machine learning model. A machine learning service's model training system can be utilized, e.g., along with optimizations such as hyperparameter tuning/optimization (e.g., by training multiple models with different hyperparameter configurations and finding the resulting best-performing model), to generate a high-quality machine learning model. In some embodiments, the machine learning model may be stored and/or provided to the user, and in some embodiments the model may be immediately deployed (e.g., by a model hosting system of a machine learning service) to allow for the model to immediately be used to perform inference for client requests. As a result, in some embodiments, upon a user first submitting a request to the synthetic training data generator (or to a service including a synthetic training data generator), within a very short amount of time (compared to existing approaches) user-specific training data can be generated, which can be used to train a machine learning model, which can be deployed for immediate use.

FIG. 1 is a diagram illustrating an environment for synthetic training data generation for machine learning according to some embodiments. This environment includes a synthetic training data generator 114, which may be implemented using software executed by one computing device or multiple computing devices. The synthetic training data generator 114, in some embodiments, is implemented within a provider network 100 and may operate as part of a service that is offered to users 108 of the provider network 100.

Generally, a provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internal via one or more interface(s) 103, such as through use of application programming interface (API) calls, via a console implemented as a website or application, etc. The interface(s) 103 may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

For example, in various embodiments, a "serverless" function may include code provided by a user or other entity (such as a service of the provider network itself) that can be executed on demand Serverless functions may be maintained within provider network 100 and may be associated with a particular user or account or may be generally accessible to multiple users and/or multiple accounts. A serverless function may be associated with a URL, URI, or other reference, which may be used to call the serverless function. Each serverless function may be executed by a compute instance, such as a virtual machine, container, etc., when triggered or invoked. In some embodiments, a serverless function can be invoked through an application programming interface ("API") call or a specially formatted HyperText Transport Protocol ("HTTP") request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time. For example, as described herein, in some embodiments the synthetic training data generator 114 may utilize multiple agents, where each is implemented as a serverless function.

As shown with reference to circle (1), a user 108 may interact with the synthetic training data generator 114 by use of an electronic device 104 (e.g., a Personal Computer (PC), laptop, mobile device, etc.). For example, the user 108 may utilize one or more graphical user interfaces (GUIs) provided via a client 105 application that cause the client 105 to send requests to cause the synthetic training data generator 114 to generate synthetic training data and optionally train and/or deploy a machine learning model.

Figure 2:
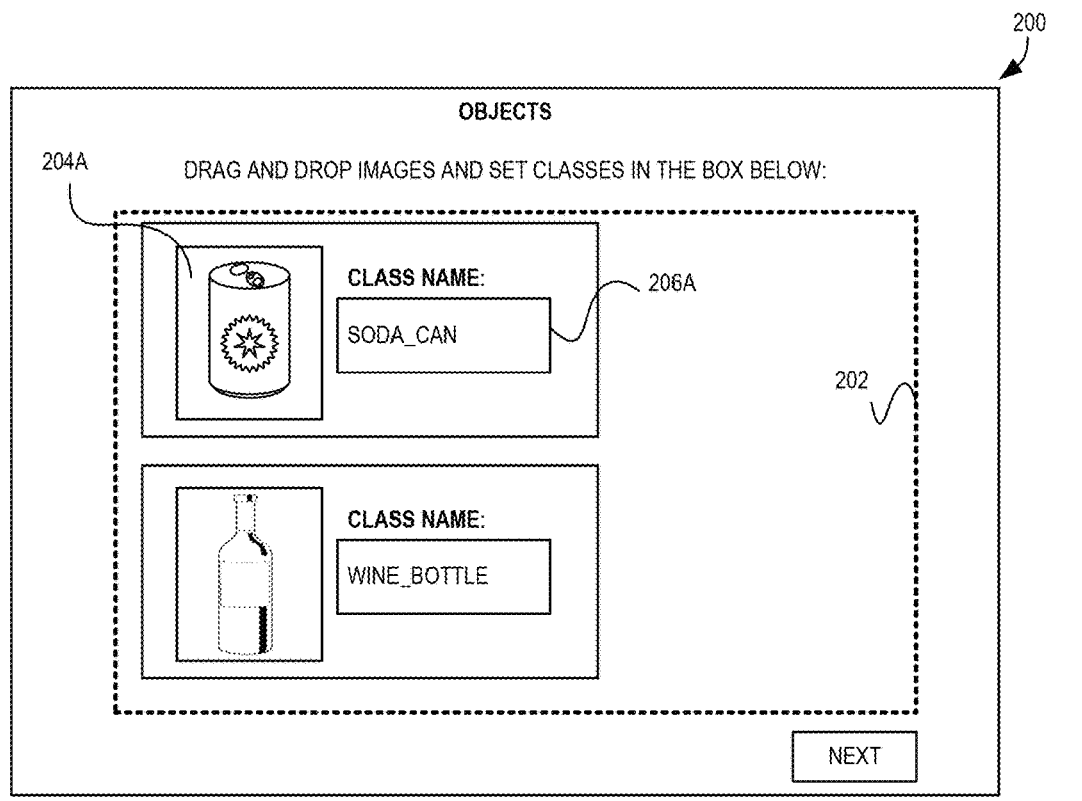
FIG. 2 is a diagram illustrating exemplary interactive graphical user interfaces used in an environment for synthetic training data generation for machine learning according to some embodiments.
Figure 2:
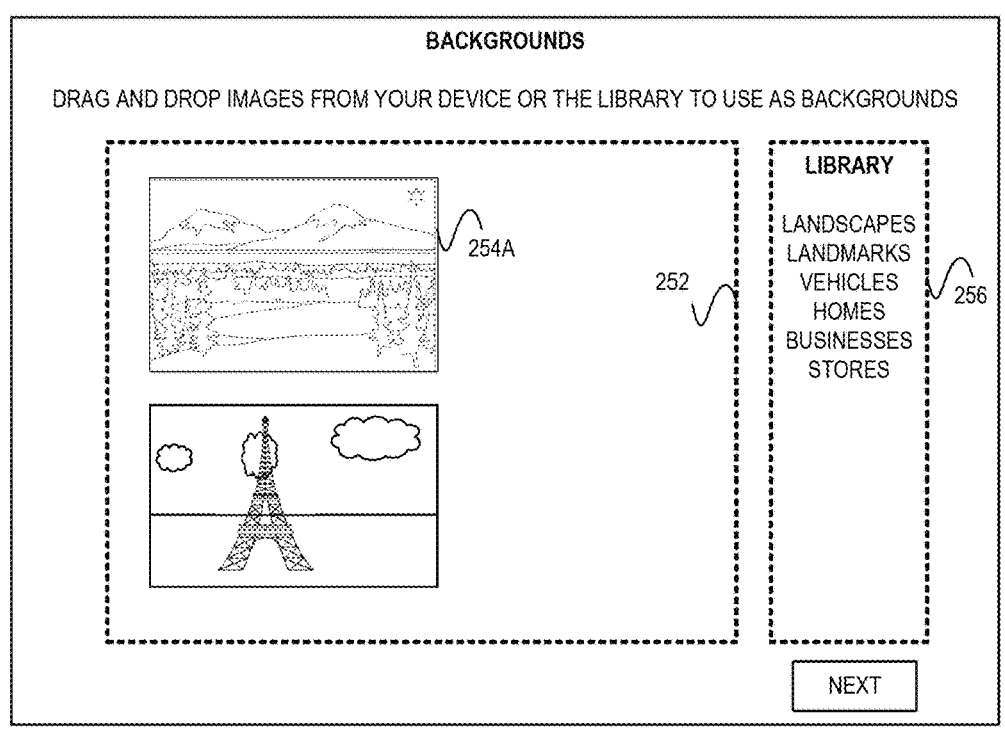

For example, FIG. 2 is a diagram illustrating exemplary interactive GUIs 200, 250 used in an environment for synthetic training data generation for machine learning according to some embodiments. The GUI 200, in some embodiments, may include a user interface element 202 that can be used by the user to provide one or more images 204 to be used to generate synthetic images. These one or more images are to include depictions of objects of interest for the user—that is, they are to include depictions of objects that the user wishes to have a machine learning model be able to detect and/or identify. In some embodiments, the user may be directed to provide images that show the object entirely (or substantially) within the frame, and the images may depict the object against a "plain" background—a completely or substantially monochromatic background (e.g., a single color such as white, black, green), a transparent background (as used in many image formats), etc. In some embodiments, the synthetic training data generator 114 may then utilize image processing techniques known to those of skill in the art to identify the contours of the object depicted within the image, which provides a benefit in being able to pull only the object from these images and overlay the object against other backgrounds, as described herein. In this example, the user may provide these images 204 by using a drag-and-drop functionality, an "upload" set of dialogs, etc., known to those of skill in the art to upload the image(s); however, in other embodiments the user may also provide identifiers (e.g., URLs) associated with images (or a collection of images, such as within a folder/bucket) that may be stored at a location accessible to the synthetic training data generator (e.g., within a storage service 116), and thereafter the images may be retrieved (e.g., via downloading) the images using those identifiers. For example, in some embodiments the user may have previously uploaded images as shown via circle (0) to a storage service 116 of the provider network. As another example, the user may select object images from a library of images provided via the user interface 200.

The user may also be prompted, via GUI 200, to provide an associated class identifier 206 (also commonly referred to as a class or class name) for each provided image that identifies which type of object is depicted in the image. As is shown in the example depicted in FIG. 2, the user may provide an image 204A depicting a soda can against a monochromatic background and also provide a class identifier 206A of "soda_can" (e.g., via typing or otherwise selecting text characters, such as from a list) to be associated with this image 204A. In other embodiments the class identifier may be provided in other ways; for example, the name of the image 204 that is provided may include the class identifier directly within the name—e.g., soda_can_1.jpg, image1[soda_can].jpg, etc.

In some cases, the user may provide only one image including one particular type of object, though in other use cases the user may provide multiple images depicting one or multiple types of objects—e.g., multiple images showing different objects of a same type/class (e.g., multiple soda cans), and/or multiple images showing different types/ classes of objects, such as in the illustrated example where a "soda_can" image 204A is provided as well as a "wine_ bottle" image.

After a user completes providing image(s) (or identifiers thereof) and associated class(es) via this interface 200 (where the provided data may or may not be immediately transmitted to the synthetic training data generator, for example, using HTTP messaging), the user may be presented another interface 250 allowing the user to provide or identify "background" images 254 to be used in the synthetic image generation process via a user interface element 252. Background images can be used as a backdrop (or back layer) for one or more of the "object" images 204 to be overlaid upon. In many cases, if a user desires to train a machine learning model to detect or identify objects in a particular environment (e.g., a particular view within a particular room, a particular view of the outdoors from a particular vantage point, etc.), it may be beneficial for a user to provide, as background images, images captured from that perspective or otherwise depicting that perspective, preferably without any of the to-be-detected objects present. For example, if a user seeks to train a machine learning model that can identify particular fish shown in an image captured by a camera unit adjacent to a fish tank, the user may take a picture from that camera unit—preferably without any fish depicted therein—and provide this picture (or perhaps multiple pictures taken under different conditions— e.g., different time of day, different month of year, different lighting conditions) as a background image 254. Again, these images may be uploaded during interactions with the machine learning bootstrap engine 112 or synthetic training data generator 114 (shown at circle (1)), uploaded separately (shown at circle (2)) to a storage location (e.g., of a storage service 116), etc. For example, in some embodiments the user may not specify any particular background images but may instead allow the synthetic training data generator 114 to select its own background images, for example, randomly from a library of background images.

However, in some embodiments the user may also provide/identify (or select, from a library user interface 256 describing images that are already available to the synthetic training data generator within a library of images) other non-specific background images. In some cases—such as when a user desires a machine learning model to be generally applicable to a variety of scenes—the user may benefit from diversity in the backgrounds of the images. Thus, a variety of different background images may be provided by the user and/or selected by the user from a library of images. Additionally, as indicated above, a user may allow (e.g., via a user interface element, such as a checkbox) the synthetic training data generator 114 to select its own background images, for example, randomly from a library of background images.

Figure 3:
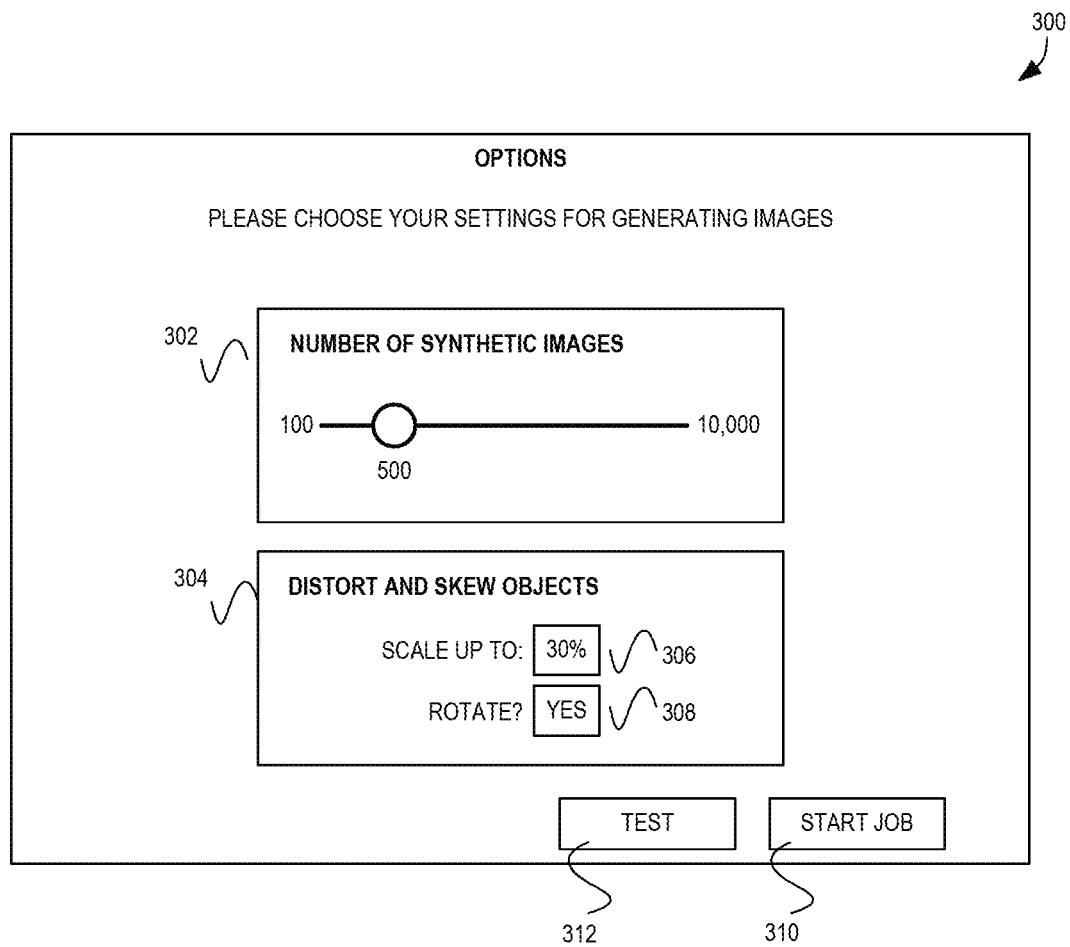
FIG. 3 is a diagram illustrating another exemplary interactive graphical user interface used in an environment for synthetic training data generation for machine learning according to some embodiments.

In addition to selecting or defining the particular objects and/or images involved in generating synthetic images, a user may also customize the image generation process in some embodiments. For example, FIG. 3 is a diagram illustrating another exemplary interactive graphical user interface 300 used in an environment for synthetic training data generation for machine learning according to some embodiments. In this example, a user may be provided a user interface element 302 allowing the user to control how many synthetic images should be generated. In this case, the user interface element 302 presents a slider element allowing the user to select between 100 and 10,000 images, though the type of element and example numbers are to be understood as being examples, and other types of elements (e.g., text input boxes, drop-downs, etc.) or numeric ranges can be used.

As another example, a user may be provided a user interface element 304 allowing the user to control how the synthetic image generation process is to be performed—e.g., by controlling transformations or filters that may be utilized. For example, a first user interface element 306 may be provided allowing a user to indicate to what degree an object (from an object image) may possibly be scaled when being overlaid on a background image, and a second user interface element 308 may be provided allowing a user to indicate whether an object is to be rotated when being overlaid on a background image. Of course, many other types of controls may be exposed to users, including but not limited to whether objects or backgrounds are to be "softened" or blurred, to what degree a softening/blurring is to be applied, whether (and possibly to what degree) coloring filters are to be applied to objects and/or backgrounds, and the like.

During this configuration process, in some embodiments the user may select a "test" user interface element 312 allowing the user to test the configuration of the training job. For example, the user may wish to view a few samples of what an example synthetic image would look like based on the user's specifications so far, and by selecting this element 312, a test request message may be sent to a machine learning bootstrap engine 112 (or, in some embodiments, directly to a synthetic training data generator 114), where the machine learning bootstrap engine 112 may generate a small number (e.g., substantially fewer than the entire number of synthetic images, as shown at element 302—such as two, three, five, or ten) of synthetic images and send them back to the user's device so that the user can see what the images may look like, and change any configuration settings as needed. This can beneficially allow a user to get quick feedback as to their configuration choices to allow the user to "fix" the configuration (before submitting the full job) to thus prevent the user from launching a large-scale job that might ultimately result in non-useful images being generated.

At some point, the user may finish providing image data and any control specifications and may "submit" a synthetic training job, e.g., via a "start job" user interface element 310 shown in FIG. 3. This may cause a start job request message (e.g., an API call, which may be carried by an HTTP request message) to be sent to a machine learning bootstrap engine 112 (or, in some embodiments, directly to a synthetic training data generator 114) at circle (1) as shown in FIG. 1. The machine learning bootstrap engine 112 at circle (2) may begin processing for generating synthetic training data. For example, in some embodiments where the user 108 has uploaded object images 204 and/or background images 254, these images may be stored as input data 122 to a storage service 116 at circle (3A) or retrieved by the machine learning bootstrap engine 112 at circle (3A) from the storage service 116. Further, in some cases where images 204/254 from a synthetic training library 124 are selected by a user for use (e.g., as shown in user interface element 256 in FIG. 2 with regard to background images), the start job request message (or associated message) may provide identifiers of one or more images to be used from this library, and at circle (3B) the machine learning bootstrap engine 112 may obtain these images, e.g., from a location of a storage service 116. With all necessary images and any specified control/configuration information from the user, the synthetic training data generator 114 generates synthetic images 132 and corresponding labels 134 at circle (4), which together may be referred to as synthetic training data 126 and optionally stored at a storage location, e.g., of a storage service 116.

In some embodiments, the synthetic training data generator 114 (or another module of the machine learning bootstrap engine 112) may also generate algorithm metadata 133 used for training a machine learning model. For example, the algorithm metadata 133 may include one or more training files used by the ML algorithm during training to identify the particular images 132 to be used for training.

Figure 4:
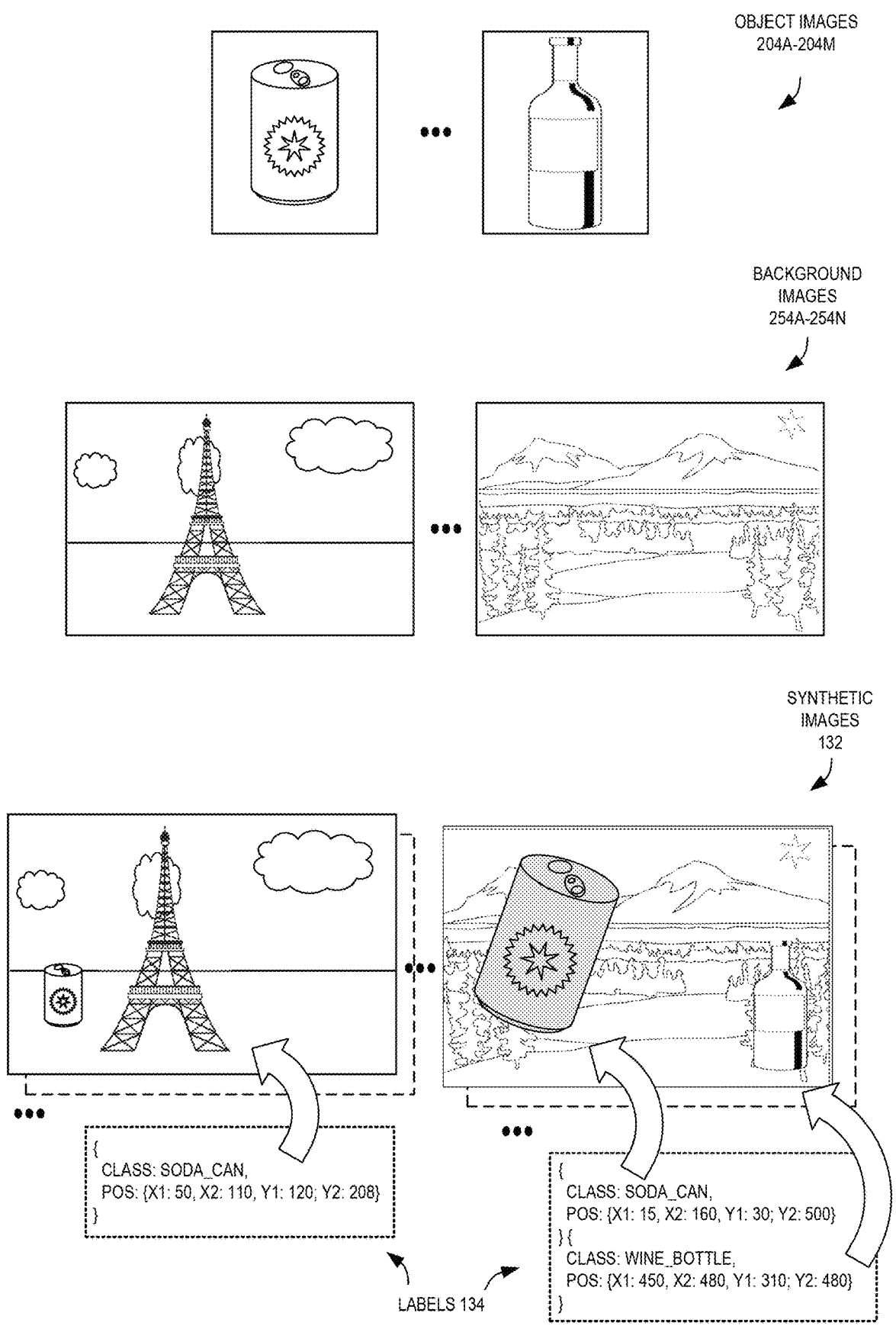
FIG. 4 is a diagram illustrating exemplary synthetic training data generation according to some embodiments.

The generation of synthetic training data 126 may occur in a variety of ways. For example, FIG. 4 is a diagram illustrating exemplary synthetic training data generation according to some embodiments. As shown in FIG. 4, a collection of specified/identified object images 204A-204M are obtained by the synthetic training data generator, which may identify the contours of the objects depicted in the images, e.g., by removing a completely/substantially monochromatic background or relying on a transparent background encoded in the image. The synthetic training data generator may also obtain the set of background images 254A-254N specified/identified for the job.

The synthetic training data generator then generates many synthetic images 132 (and corresponding labels 134 and/or algorithm metadata 133) by overlaying one or more of the object images 204A-204M (or variants thereof, for example images resulting from being transformed or filtered in some manner as described herein) over ones of the background images 254A-204N (or variants thereof, again resulting from being transformed or filtered in some manner as described herein).

For example, as shown in the synthetic image on the left, a soda can depicted in a first of the object images has been scaled down (shrunk) and overlaid on a first of the background images (depicting a view of the Eiffel Tower). A corresponding label 134 is generated that indicates that an object with the class "soda_can" exists within the synthetic image at a particular location, here represented as a "pos" (or position) element having X and Y coordinates defining a bounding box surrounding the overlaid object.

As a second example, variants of two of the object images—a soda can and a wine bottle—are overlaid on top of a second background image depicting a mountain landscape, resulting in a synthetic image with a soda can that is scaled up, rotated, blurred, and color modified (here represented with shading) as well as a wine bottle that is scaled down and blurred. Likewise, the associated set of labels identifies both object classes—"soda_can" and "wine_bottle"—together with corresponding locations of these objects within the synthetic image. Although not shown herein, such transformations/filters may be applied to only the objects, only the backgrounds, both the objects and backgrounds individually before being combined, or on the resultant combined synthetic images.

Although only two examples are illustrated based on a limited number of object images and background images, it is to be understood that in many use cases this process may generate substantially more synthetic images (e.g., more than 100, more than 1,000, more than 10,000, etc.), may be based on use of one or more object images (e.g., one, two, five, ten, one hundred), may be based on one or more background images (e.g., one, two, five, ten, one hundred), may be based on use of zero, one, or multiple image transformations/filters (some or all of which may be consistently applied and/or inconsistently applied across the images), etc., to generate a wide amount of variation in the generated synthetic training data.

Additionally, the particular format of and data included within labels 134 is different in different embodiments. For example, one exemplary label could be formatted as follows, with an identifier of a folder storing the image, a filename of the image, a path for the image, one or more values defining a size of the image, a class/name of an object within the image, bounding box coordinates encapsulating the object, etc.:

```
<label>
    <folder>JPEGImages</folder>
    <filename>100000.jpg</filename>
    <path>/tmp/generated/JPEGImages/100000.jpg</path>
    <size>
        <width>640</width>
        <height>640</height>
        <depth>3</depth>
    </size>
    <object>
        <name>nescau</name>
        <bndbox>
            <xmin>496</xmin>
            <ymin>496</ymin>
            <xmax>496</xmax>
            <ymax>496</ymax>
        </bndbox>
    </object>
</label>
```

Turning back to FIG. 1, in some embodiments the user 108 may specify that the synthetic training data generator 114 is to simply generate the synthetic training data 126, which may then be obtained or otherwise accessed by the user for their own purposes—e.g., training a machine learning model on their own, etc.

As indicated above, in some embodiments the generated synthetic training data 126 includes algorithm metadata 133, e.g., one or more training files, a validation file, etc., that can be used for training a model. For example, for each class involved (e.g., each type of object placed in the synthetic images 132) a training file may be generated that identifies ones of the synthetic images and indicates whether an object of that particular class (associated with that training file) is represented within that corresponding synthetic image.

As one example, in a scenario where 2,000 synthetic images are generated and the first 1000 images have a first class of object and the second 1000 images have the second class of object, a first training file may be generated (for the first class) including identifiers of all 2000 images but with a corresponding value (e.g., "1") associated with the 1000 identifiers of images having the first class of object (to indicate that these images do have an object of the first class) and a different corresponding value (e.g., "−1" or "0") associated with the 1000 identifiers of those images not including the first class of object (indicating that these images do not have an object of the first class). Similarly, a second training file may be generated (for the second class) including identifiers of all 2000 images but with a corresponding value (e.g., "−1" or "0") associated with the 1000 identifiers of images not having the second class of object and a different corresponding value (e.g., "1") associated with the 1000 identifiers of those images that do include the second class of object. Such a training file may be generated in some embodiments for each class of object that is included (via the overlaying techniques disclosed herein) in the set of synthetic images 132.

The algorithm metadata 133 may also include a validation file for each class. As is known in the art, when training a model, a training dataset may be split into a first subset for training and a second subset for validation—e.g., 80% for training, and 20% for validation. Thus, in some cases a validation file may be generated for a class in a similar manner as is described above with regard to training files—e.g., a class may have a validation file with identifiers of those images that are to be used for validation and that include an object of that class.

However, in some embodiments the synthetic training data generator 114 may be part of a machine learning bootstrap engine 112 and the user 108 may specify that the resultant synthetic training data 126 is to be used to train a machine learning model and optionally to deploy the resultant model for use. In such scenarios, at circle (5) the machine learning bootstrap engine 112 may send a request to a model training system 120 to train such a model. The request may identify the synthetic training data 126 to be used together with an identifier of a type of model to be trained (object detection, etc.) or an identifier of an existing model to be retrained, for example. Upon completion of the training, a set of model artifacts 128 may be generated and stored (e.g., at a location of a storage service 116 so that the user 108 may obtain the model). Further details of a model training system 120 that may be implemented as part of a machine learning service 110 are provided herein with regard to FIG. 7.

In some embodiments, the machine learning bootstrap engine 112 may utilize a tuning system 118 of the model training system 120 at circle (6) to train and find a "good" machine learning model. For example, the tuning system 118 may implement a hyperparameter tuning (also referred to as hyperparameter optimization) technique to (at least partially) train a same model using different numbers, types, and/or values of hyperparameters. The tuning system 118 may then identify which of the multiple candidate models is performing the best, e.g., by using holdout testing techniques or assessing model accuracy in other ways known to those of skill in the art.

Upon completion of model training, in some embodiments the user 108 may cause the machine learning bootstrap engine 112 (via use of the machine learning service 110) to deploy the resultant model for use. For example, the machine learning bootstrap engine 112 may send another request to a model hosting system 140 of the machine learning service 110 to setup the model 121 for inference at circle (7A) and also setup an endpoint 130 at circle (7B) that can be used by clients within the provider network 100 and/or outside the provider network 100 to send inference requests to. Thereafter, a client (e.g., client 105) may capture an image and send the image as part of (or associated with) an inference request to the endpoint 130 at circle (8), where the request is passed to the hosted model 121, which performs the inference and may provide back results, e.g., back to the client 105 or stored to a location provided by the storage service.

Figure 5:
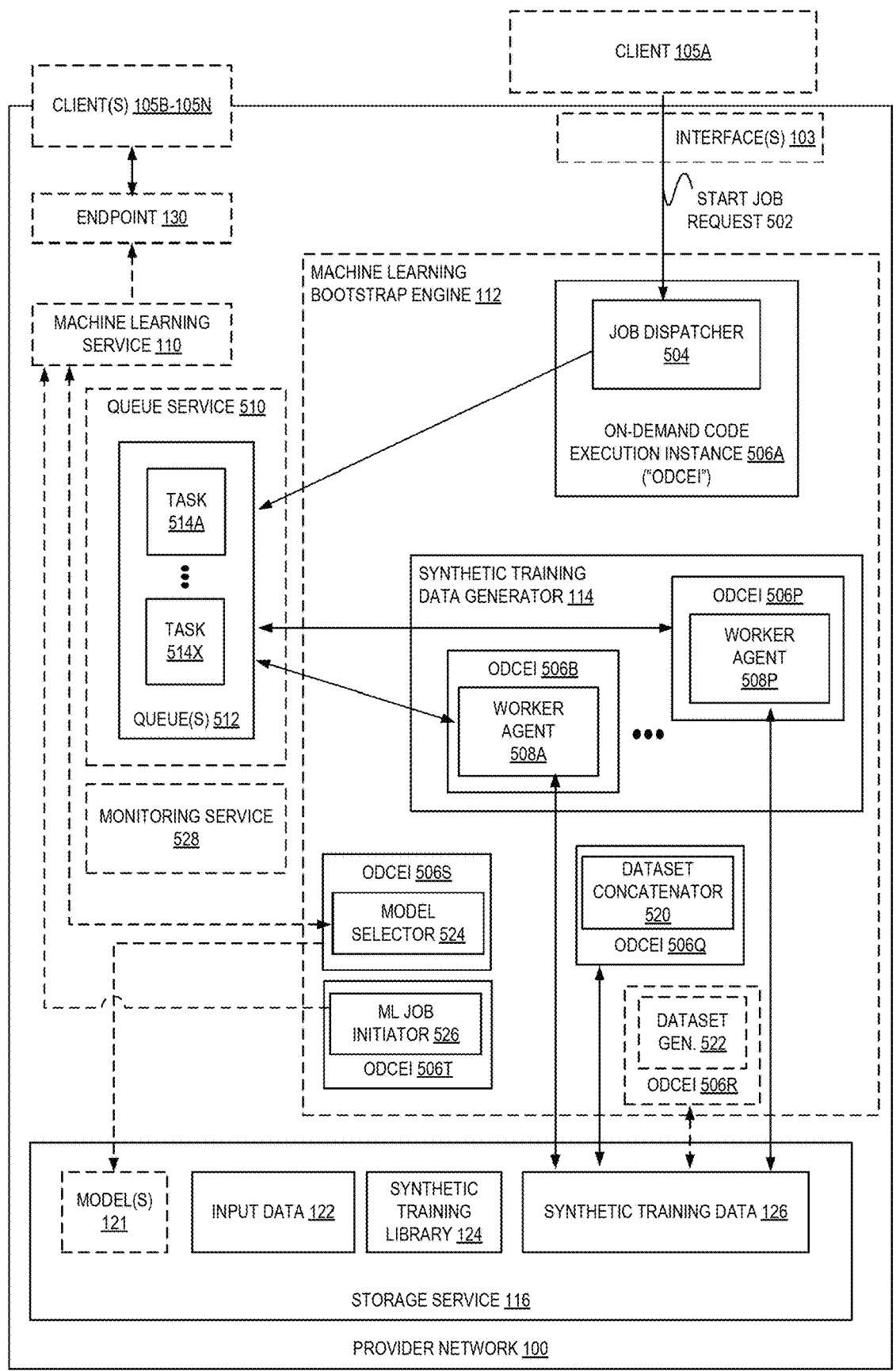
FIG. 5 is a diagram illustrating an exemplary environment for synthetic training data generation for machine learning according to some embodiments.

As indicated herein, the process of generating the synthetic training data 126 can be performed efficiently using parallelization techniques. As one example, FIG. 5 is a diagram illustrating an exemplary environment for synthetic training data generation for machine learning according to some embodiments. In this example, a start job request 502 issued by a client 105A may be received by a job dispatcher 504 of the machine learning bootstrap engine 112. The job dispatcher 504 may comprise software and may be implemented as a serverless function executed by an on-demand code execution service instance 506A, or "ODCEI." The job dispatcher 504 may analyze the job, e.g., to identify the input data 122 and/or images from synthetic training library 124, the types of filters or transformations to be used, the number of synthetic images 132 to be generated, etc. Based on this analysis, the job dispatcher 504 may generate tasks 514A-514X that are placed in one or more queues 512 (e.g., of a queue service 510), which may cause multiple worker agents 508A-508P (e.g., as software—such as serverless functions executed by multiple on-demand code execution service instances 506B-506Z) to pull tasks from the queue(s) 512. Each task 514 may specify how to generate one or multiple synthetic images 132—e.g., by specifying the object image(s), the background image(s), the involved transformations/filters, etc.—allowing the worker agents 508 to simply execute a set of commands to generate the synthetic images 132 and corresponding metadata (e.g., training files, validation files, labels, or other related artifacts that may be used for training) to be stored by a storage service 116 and that forms the synthetic training data 126. In this manner, a number of worker agents can work in parallel, and the number of worker agents can be scaled up or down to perform the synthetic training data 126 generation as needed. A dataset concatenator 520 (of an ODCEI 506Q) may be notified of the completion of the tasks (e.g., by the queue service 510, a monitoring service 528, etc.) or otherwise detect the completion, which may consolidate individual job results from the multiple agents 508 together into a single bundle. Another dataset generator 522 (executed by an ODCEI 506R) may then reformat the synthetic training data 126 into an appropriate format for use in training a model (e.g., RecordIO format or the like), and a ML job initiator 526 (executed by ODCEI 506T) may detect the availability of the dataset and send one or more requests to the machine learning service 110 to train a model 121 (or multiple variants of the model). Optionally, a model selector 524 (executed by ODCEI 506S) may identify a resulting model (e.g., a single model or a best model from multiple candidates) and may store the model 121 and send one or more requests to the machine learning service 110 to host the model.

Figure 6:
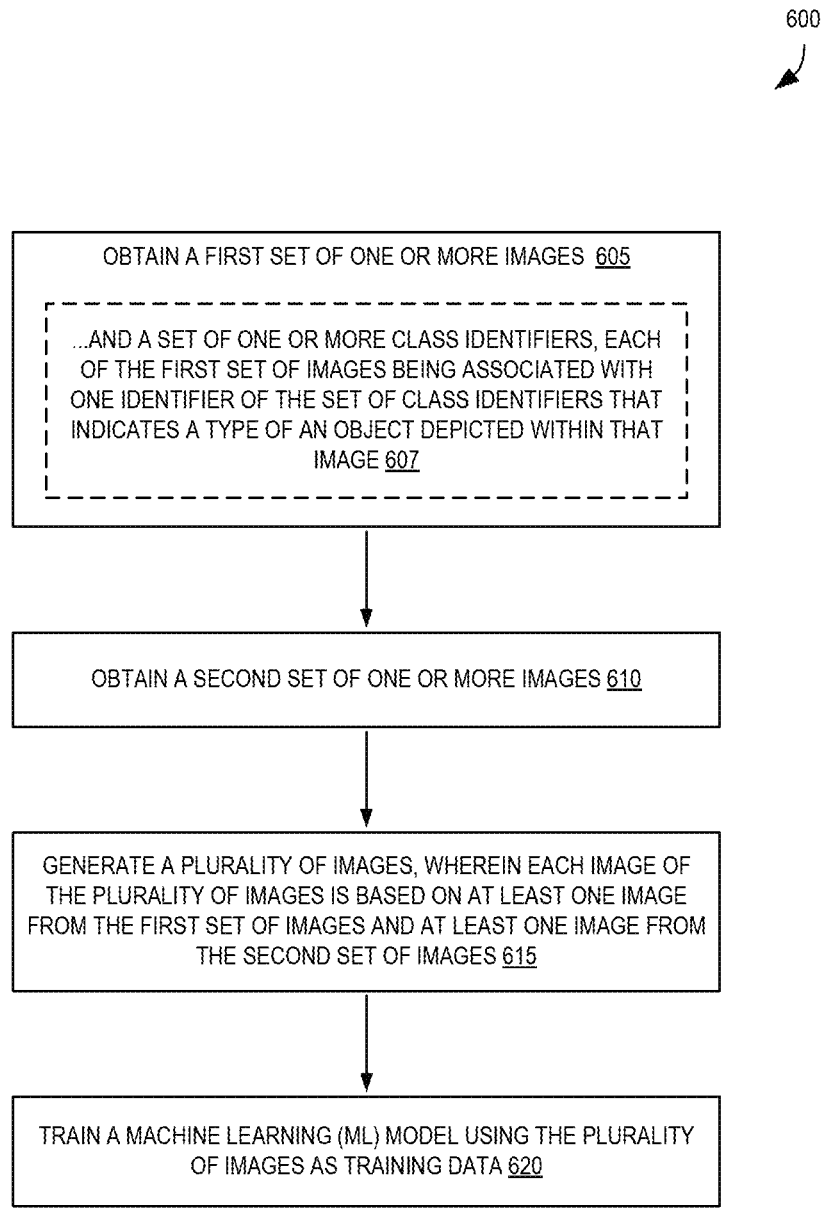
FIG. 6 is a flow diagram illustrating operations of a method for synthetic training data generation for machine learning according to some embodiments.

FIG. 6 is a flow diagram illustrating operations 600 of a method for synthetic training data generation for machine learning according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the synthetic training data generator 114, machine learning bootstrap engine 112, and/or machine learning service 110 of the other figures.

The operations 600 include, at block 605, obtaining a first set of one or more images. Block 605 may further include obtaining a set of one or more class identifiers, each of the first set of images being associated with one identifier of the set of class identifiers that indicates a type of an object depicted within that image. Block 605 may include receiving the first set of images from a client executed by an electronic device of a user, which may be sent using one or more HTTP messages. The user may have selected the first set of images by selecting them using a graphical user interface of a client application, e.g., via a drag-and-drop operation into a GUI element, by using an operating-system provided file/directory navigator tool, etc. The user may also have uploaded the first set of images to a location—such as a location provided by a storage service—and the user (via the electronic device) may have sent a message including an identifier of the location at which the first set of images is stored. Thus, in some embodiments, the obtaining the first set of images may include using the identifier (e.g., a URL or other resource identifier) to send a request for the first set of images and thereafter receive the first set of images from the location. The set of class identifiers may be submitted in one or more files along with the first set of images or may be provided as (or in) file names associated with the images. In some embodiments, each of the first set of images depicts a corresponding object against a transparent, substantially monochromatic, or completely monochromatic background.

The operations 600 further include, at block 610, obtaining a second set of one or more images. The second set of images may comprise one or more images to be used as backgrounds in the generated synthetic images. Obtaining the second set of images may include receiving the second set of images (or identifiers of the second set of images) from a client executed by an electronic device of a user, which may be sent using one or more HTTP messages. The user may have selected the second set of images by selecting them using a graphical user interface of a client application, e.g., via a drag-and-drop operation into a GUI element, by using an operating-system provided file/directory navigator tool, by selecting images from a user interface element providing a library of images to choose from, etc. The user may also have uploaded the second set of images to a location—such as a location provided by a storage service—and the user (via the electronic device) may have sent a message including an identifier of the location at which the second set of images is stored. Thus, in some embodiments, the obtaining the second set of images may include using the identifier (e.g., a URL or other resource identifier) to send a request for the second set of images and thereafter receive the second set of images from the location.

In some embodiments, the first set of images and the second set of images were transmitted by a client device of a user outside the provider network.

The operations 600 further include, at block 615, generating a plurality of images, wherein each image of the plurality of images is based on at least one image from the first set of images and at least one image from the second set of images. In some embodiments, the generating includes overlaying at least one object depicted in the first set of images over a first image from the second set of images to yield a combined image. Block 615 may also include applying one or more filters to the combined image, the at least one object, or the first image, which can increase the diversity of the plurality of images, enabling a resulting machine learning model trained using these images to be more able to successfully perform inference using different input images taken under different conditions—e.g., in different amounts or types of light, with different image resolutions or qualities, etc.

In some embodiments, at least one of the plurality of images is based on two or more of the first set of images and one of the second set of images.

Block 615 may also include generating a plurality of labels corresponding to the plurality of images, where each of the plurality of labels identifies (1) a location (e.g., coordinates representing a bounding box) within the corresponding image where an object depicted in the first set of images is located or where a variant (e.g., rotated version, blurred version, color-adjusted version, etc.) of the object is located, and (2) the class identifier of the object.

The generating of the plurality of images may be performed at least partially in parallel by a plurality of computing instances (e.g., agents executed by separate VMs, agents executed as serverless functions, etc.).

The operations 600 further include, at block 620, training a machine learning (ML) model using the plurality of images as training data. Block 620 may include sending a request to a ML service to train a model, where the request may identify a ML algorithm to be used and/or a location of the synthetic images and/or labels. In some embodiments, training the ML model comprises: running a plurality of ML model training jobs with a corresponding plurality of different hyperparameter combinations; and selecting the ML model based on evaluating results of the plurality of ML model training jobs.

In some embodiments, the operations further include causing the ML model to be deployed within a provider network; and configuring a web service endpoint of the provider network to cause inference requests received at the web service endpoint to be serviced using the deployed ML model.

In some embodiments, the operations further include receiving, at the web service endpoint, a request to generate the plurality of images; and generating a plurality of jobs based on the request, wherein the generating of the plurality of images comprises executing the plurality of jobs by a plurality of worker agents.

Figure 7:
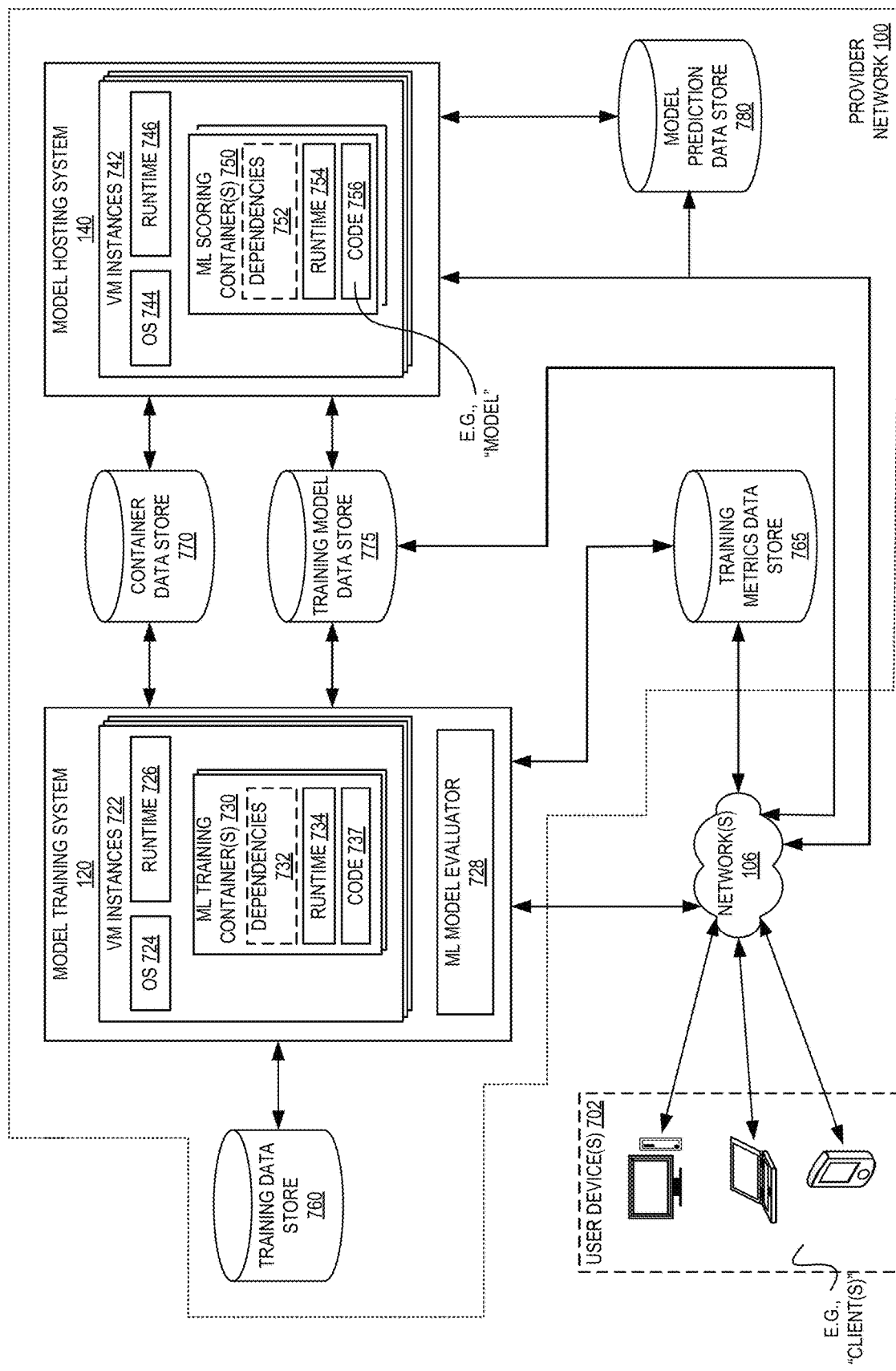
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (e.g., a PC or mobile device, such as client device 104), a model training system 120, a model hosting system 140, a training data store 760, a training metrics data store 765, a container data store 770, a training model data store 775, and a model prediction data store 780. A machine learning service described herein may include one or more of these entities, such as the model hosting system 140, model training system 120, etc.

In some embodiments, users, by way of user devices 702, interact with the model training system 120 to provide data that causes the model training system 120 to train one or more machine learning models. A machine learning model, generally, may be thought of as one or more equations that are "trained" using a set of data according to an algorithm (e.g., linear regression, logistic regression, k-means clustering, principal component analysis, factorization machines, neural topic modeling, latent dirichlet allocation, gradient boosted trees, time series forecasting, image classification, etc.). In some embodiments, the model training system 120 provides ML functionalities as a Web service, and thus messaging between user devices 702 and the model training system 120 (or provider network 100), and/or between components of the model training system 120 (or provider network 100), may utilize HTTP messages to transfer data in a machine-readable file format, such as eXtensible Markup Language (XML) or JavaScript Object Notation (JSON).

The user devices 702 can interact with the model training system 120 via frontend 729 of the model training system 120. For example, a user device 702 can provide a training request to the frontend 729 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that is used to define a machine learning model. The executable instructions (e.g., the algorithm) can be written in any programming language (e.g., Python, Ruby, C++, Java, etc.). In some embodiments, the algorithm is pre-generated and obtained by a user, via the user device 702, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 702 may provide, in the training request, an algorithm written in any programming language. The model training system 120 packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (e.g., an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 702 provides, in the training request, an indicator of a container image (e.g., an indication of an address or a location at which a container image is stored). For example, the container image can be stored in a container data store 770, and this container image may have been previously created/uploaded by the user. The model training system 120 can retrieve the container image from the indicated location and create a container using the retrieved container image. The container is then loaded into a virtual machine instance 722 for training a machine learning model, as described in greater detail below.

The model training system 120 can use the information provided by the user device 702 to train a machine learning model in one or more pre-established virtual machine instances 722 in some embodiments. In particular, the model training system 120 includes a single physical computing device or multiple physical computing devices that are interconnected using one or more computing networks (not shown), where the physical computing device(s) host one or more virtual machine instances 722. The model training system 120 can handle the acquisition and configuration of compute capacity (e.g., containers, instances, etc., which are described in greater detail below) based on the information describing the computing machine on which to train a machine learning model provided by the user device 702. The model training system 120 can then train machine learning models using the compute capacity, as is described in greater detail below. The model training system 120 can automatically scale up and down based on the volume of training requests received from user devices 702 via frontend 729, thereby relieving the user from the burden of having to worry about over-utilization (e.g., acquiring too little computing resources and suffering performance issues)

or under-utilization (e.g., acquiring more computing resources than necessary to train the machine learning models, and thus overpaying).

In some embodiments, the virtual machine instances 722 are utilized to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be utilized to isolate execution of a task from other processes (e.g., task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (e.g., creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (e.g., the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or utilize) code or libraries from dependencies 732. The runtime 734 is configured to execute the code 737 in response to an instruction to begin machine learning model training. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (e.g., execute the executable instructions that represent an algorithm that defines the selected machine learning model) that corresponds with the identified type of training data.

In some embodiments, the runtime 734 is the same as the runtime 726 utilized by the virtual machine instance 722. In some embodiments, the runtime 734 is different than the runtime 726 utilized by the virtual machine instance 722.

In some embodiments, the model training system 120 uses one or more container images included in a training request (or a container image retrieved from the container data store 770 in response to a received training request) to create and initialize a ML training container 730 in a virtual machine instance 722. For example, the model training system 120 creates a ML training container 730 that includes the container image(s) and/or a top container layer.

Prior to beginning the training process, in some embodiments, the model training system 120 retrieves training data from the location indicated in the training request. For example, the location indicated in the training request can be a location in the training data store 760. Thus, the model training system 120 retrieves the training data from the indicated location in the training data store 760. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (e.g., a buffer storing the retrieved portion is nearly empty), then the model training system 120 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (e.g., coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 120 as input parameters to some or all of the instructions being executed.

In some embodiments, executing the executable instructions causes the virtual machine instance 722 (e.g., the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 120 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 120 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (e.g., information indicating that N ML training containers 730 are collectively training a machine learning model and that a particular ML training container 730 receiving the configuration information is ML training container 730 number X of N), which can be included in the resulting model data. By parallelizing the training process, the model training system 120 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 120 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 120 can further provide configuration information to each ML training container 730 via the virtual machine instances 722 (e.g., information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 120 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (e.g., known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 702, can transmit a request to the model training system 120 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 120 can cause the virtual machine instance 722 to modify the execution of code stored in an existing ML training container 730 according to the data provided in the modification request. In some embodiments, the user, via the user device 702, can transmit a request to the model training system 120 to stop the machine learning model training process. The model training system 120 can then instruct the virtual machine instance 722 to delete the ML training container 730 and/or to delete any model data stored in the training model data store 775.

As described below, in some embodiments, the model data stored in the training model data store 775 is used by the model hosting system 140 to deploy machine learning models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (e.g., rapid initialization of machine learning model training in ML training container(s) 730) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 702, the model hosting system 140, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 742. The model hosting system 140 can handle the acquisition and configuration of compute capacity (e.g., containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 702 via frontend 749 of the model hosting system 140, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 742 are utilized to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be utilized to isolate execution of a task from other processes (e.g., task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (e.g., creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (e.g., supporting software such as libraries) needed by the code 756 in some embodiments. The runtime 754 can be defined by one or more executable instructions that form at least a portion of a container image that is used to form the ML scoring container 750 (e.g., the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (e.g., predicted or "inferred" results), as described in greater detail below.

In some embodiments, the runtime 754 is the same as the runtime 746 utilized by the virtual machine instance 742. In some embodiments, runtime 754 is different than the runtime 746 utilized by the virtual machine instance 742.

In some embodiments, the model hosting system 140 uses one or more container images included in a deployment request (or a container image retrieved from the container data store 770 in response to a received deployment request) to create and initialize a ML scoring container 750 in a virtual machine instance 742. For example, the model hosting system 140 creates a ML scoring container 750 that includes the container image(s) and/or a top container layer.

As described above, a user device 702 can submit a deployment request and/or an execution request to the model hosting system 140 via the frontend 749 in some embodiments. A deployment request causes the model hosting system 140 to deploy a trained machine learning model into a virtual machine instance 742. For example, the deployment request can include an identification of an endpoint (e.g., an endpoint name, such as an HTTP endpoint name) and an identification of one or more trained machine learning models (e.g., a location of one or more model data files stored in the training model data store 775). Optionally, the deployment request also includes an identification of one or more container images stored in the container data store 770.

Upon receiving the deployment request, the model hosting system 140 initializes ones or more ML scoring containers 750 in one or more hosted virtual machine instance 742. In embodiments in which the deployment request includes an identification of one or more container images, the model hosting system 140 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 140 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 140 retrieves the identified model data file from the training model data store 775 and inserts the model data file into a single ML scoring container 750, which forms a portion of code 756. In some embodiments, the model data file is archived or compressed (e.g., formed from a package of individual files). Thus, the model hosting system 140 unarchives or decompresses the model data file to obtain multiple individual files and inserts the individual files into the ML scoring container 750. In some embodiments, the model hosting system 140 stores the model data file in the same location as the location in which the model data file was stored in the ML training container 730 that generated the model data file. For example, the model data file initially was stored in the top container layer of the ML training container 730 at a certain offset, and the model hosting system 140 then stores the model data file in the top container layer of the ML scoring container 750 at the same offset.

In embodiments in which multiple model data files are identified in the deployment request, the model hosting system 140 retrieves the identified model data files from the training model data store 775. The model hosting system 140 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 750 with the endpoint identified in the deployment request. For example, each of the initialized ML scoring container(s) 750 can be associated with a network address. The model hosting system 140 can map the network address(es) to the identified endpoint, and the model hosting system 140 or another system (e.g., a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 140 via the frontend 749, where the execution request identifies an endpoint and includes an input to a machine learning model (e.g., a set of input data). The model hosting system 140 or another system (e.g., a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 140 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (e.g., if no more trained machine learning models are needed to generate an output) or transmit the second output to a third ML scoring container 750 initialized in the same or different virtual machine instance 742 (e.g., if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (e.g., rapid initialization of ML scoring container(s) 750, rapid execution of code 756 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 702, the model training system 120, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi-arm bandit models, reinforcement learning models, ensemble machine learning models, deep learning models, or the like.

The model training system 120 and the model hosting system 140 depicted in FIG. 7 are not meant to be limiting. For example, the model training system 120 and/or the model hosting system 140 could also operate within a computing environment having a fewer or greater number of devices than are illustrated in FIG. 7. Thus, the depiction of the model training system 120 and/or the model hosting system 140 in FIG. 7 may be taken as illustrative and not limiting to the present disclosure. For example, the model training system 120 and/or the model hosting system 140 or various constituents thereof could implement various Web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 120. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 140. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 120 and the model hosting system 140, this is not meant to be limiting. For example, in some embodiments not shown, the training data store 760 is located internal to at least one of the model training system 120 or the model hosting system 140.

In some embodiments, the training metrics data store 765 stores model metrics. While the training metrics data store 765 is depicted as being located external to the model training system 120 and the model hosting system 140, this is not meant to be limiting. For example, in some embodiments not shown, the training metrics data store 765 is located internal to at least one of the model training system 120 or the model hosting system 140.

The container data store 770 stores container images, such as container images used to form ML training containers 730 and/or ML scoring containers 750, that can be retrieved by various virtual machine instances 722 and/or 742. While the container data store 770 is depicted as being located external to the model training system 120 and the model hosting system 140, this is not meant to be limiting. For example, in some embodiments not shown, the container data store 770 is located internal to at least one of the model training system 120 and the model hosting system 140.

The training model data store 775 stores model data files. In some embodiments, some of the model data files are comprised of a single file, while other model data files are packages of multiple individual files. While the training model data store 775 is depicted as being located external to the model training system 120 and the model hosting system 140, this is not meant to be limiting. For example, in some embodiments not shown, the training model data store 775 is located internal to at least one of the model training system 120 or the model hosting system 140.

The model prediction data store 780 stores outputs (e.g., execution results) generated by the ML scoring containers 750 in some embodiments. While the model prediction data store 780 is depicted as being located external to the model training system 120 and the model hosting system 140, this is not meant to be limiting. For example, in some embodiments not shown, the model prediction data store 780 is located internal to at least one of the model training system 120 and the model hosting system 140.

While the model training system 120, the model hosting system 140, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
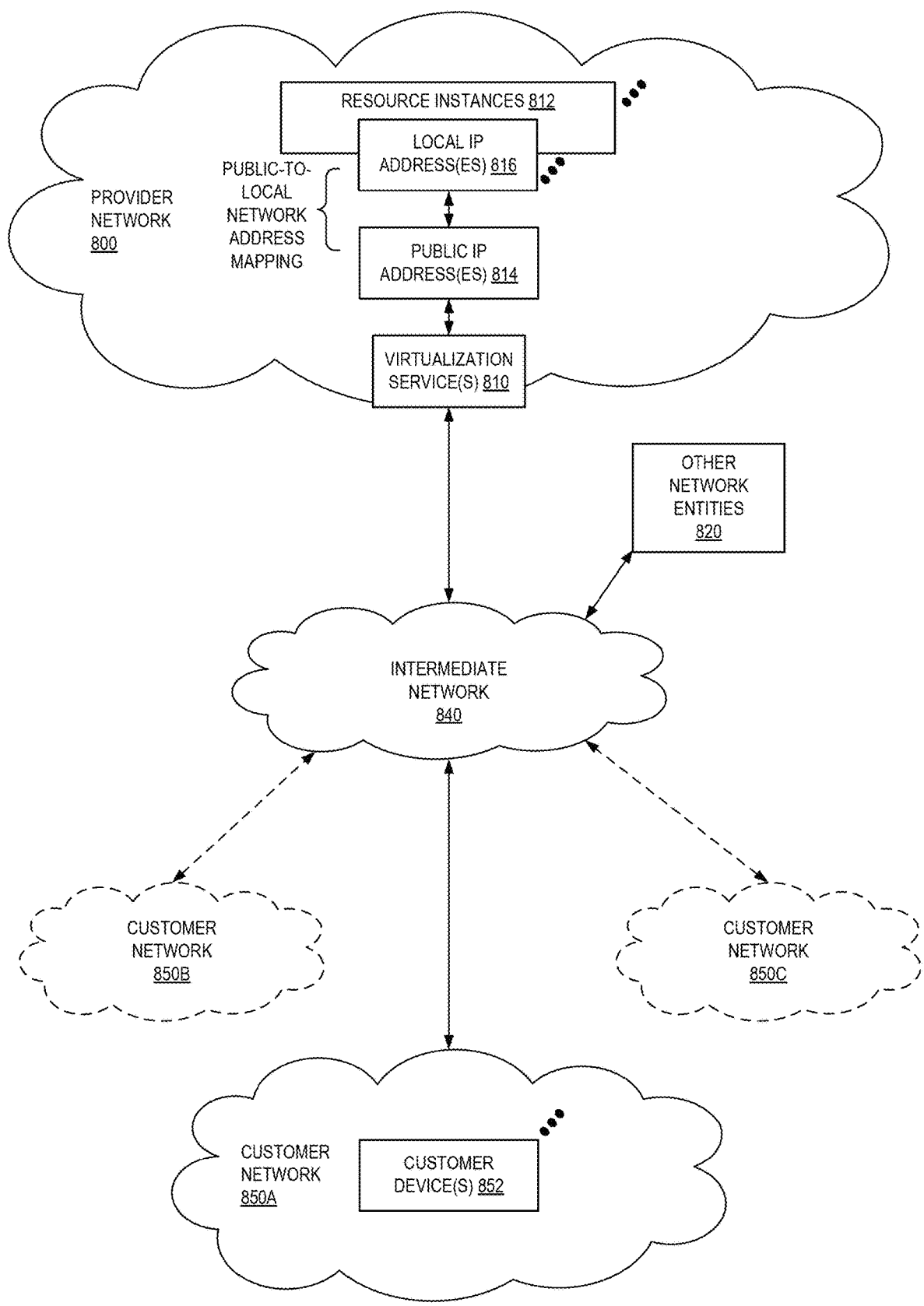
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
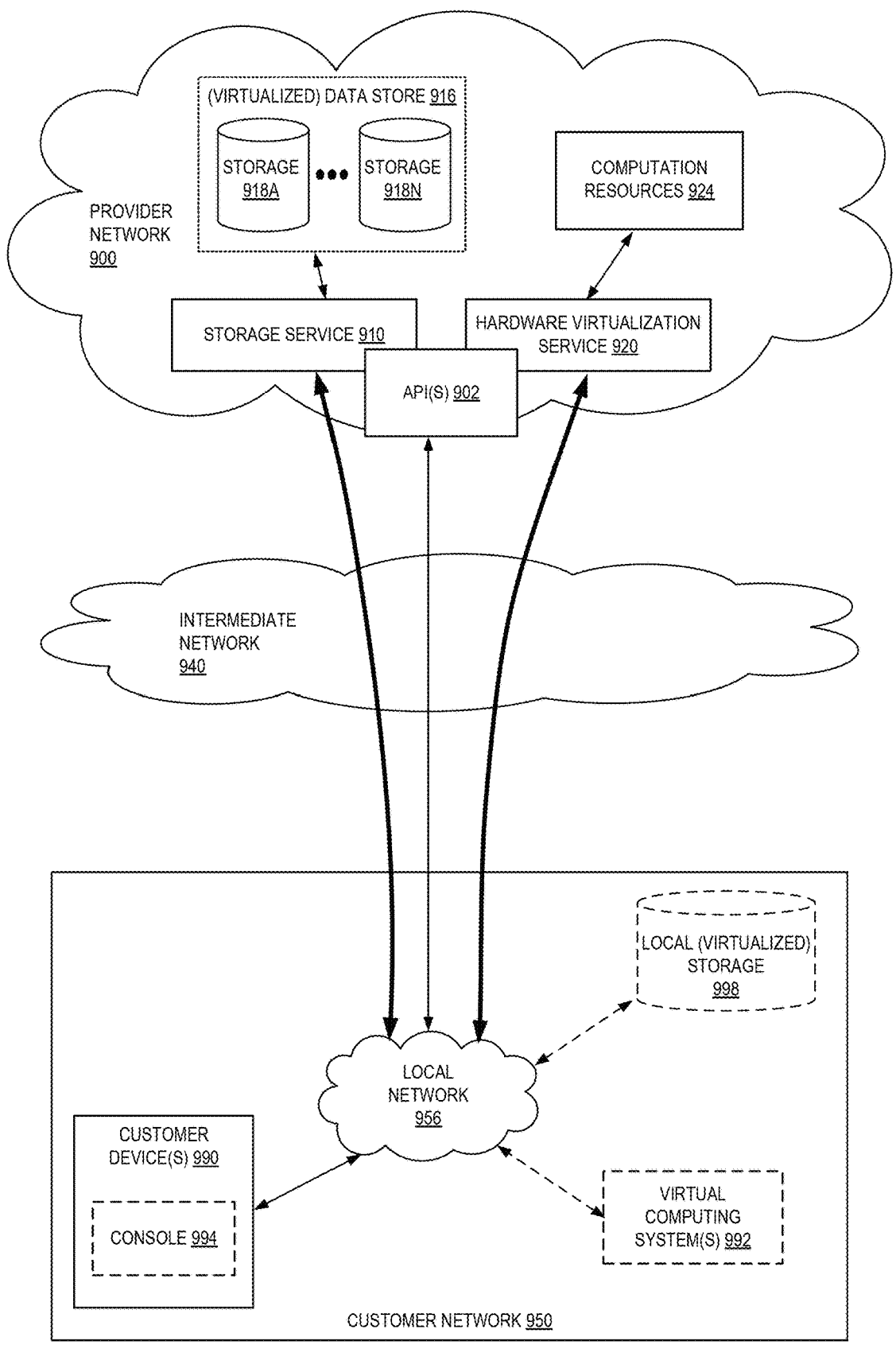
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
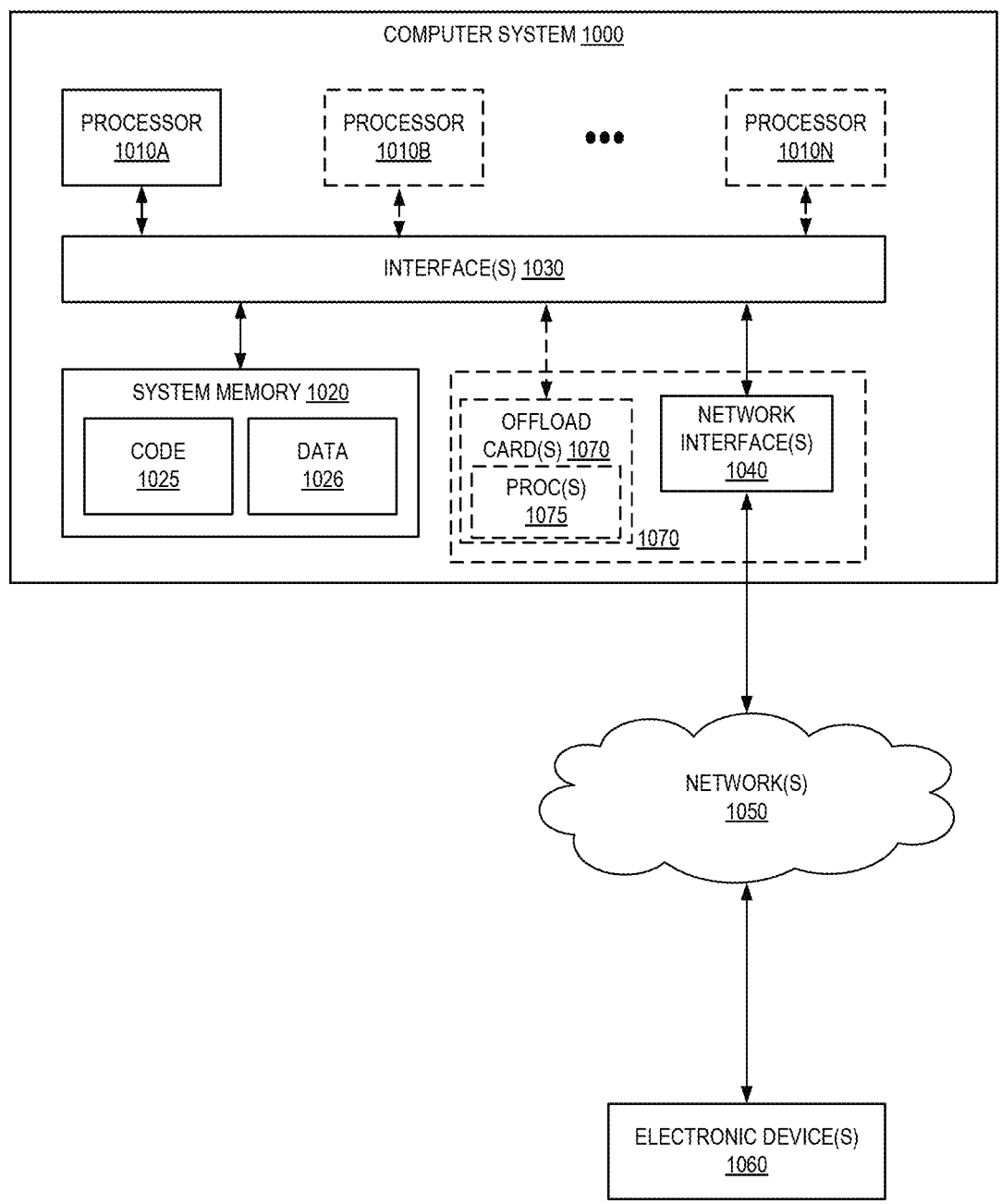
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, at a provider network, a first set of one or more images and a set of one or more class identifiers from an electronic device of a user, each of the first set of images being associated with one identifier of the set of class identifiers that indicates a type of an object depicted within that image;
    receiving, at the provider network, a second set of one or more images or identifiers of the second set of images from the electronic device of the user;
    generating, within the provider network, a plurality of user-specific training images and a corresponding plurality of labels, wherein each image of the plurality of user-specific training images is generated based on overlaying at least one object depicted in the first set of images over an image from the second set of images, and wherein each label of the plurality of labels identifies a class identifier associated with the corresponding image and a location within the corresponding image where an object of the first set of images is located or where a variant of the object of the first set of images is located;
    storing the plurality of user-specific training images to a storage location along with the corresponding plurality of labels;
    training, within the provider network, a machine learning (ML) model based on the plurality of user-specific training images and the plurality of labels; and
    deploying the ML model within the provider network to generate inferences for inference requests received from the electronic device of the user at a web service endpoint of the provider network.

2. The computer-implemented method of claim 1, wherein the plurality of user-specific training images includes more images than are in the first set of images.

3. The computer-implemented method of claim 1, wherein each of the first set of images depicts the corresponding object against a transparent, substantially monochromatic, or completely monochromatic background.

4. A computer-implemented method comprising:
    obtaining, from an electronic device of a user, a first set of one or more images and a set of one or more class identifiers, each of the first set of images being associated with one identifier of the set of class identifiers that indicates a type of an object depicted within that image;
    obtaining, from the electronic device of the user, a second set of one or more images;
    generating a plurality of user-specific training images, wherein each image of the plurality of user-specific training images is based on at least one image from the first set of images and at least one image from the second set of images; and
    training a machine learning (ML) model using the plurality of user-specific training images as training data.

5. The computer-implemented method of claim 4, wherein generating the plurality of user-specific training images includes:
    overlaying at least one object depicted in the first set of images over a first image from the second set of images to yield a combined image.

6. The computer-implemented method of claim 5, further comprising:
    receiving, from the electronic device of the user, a request to generate the plurality of user-specific training images; and
    applying one or more filters or transformations to the combined image, the at least one object, or the first image, wherein at least one of the one or more filters or transformations was selected or configured by the user that submitted the request to generate the plurality of user-specific training images.

7. The computer-implemented method of claim 4, further comprising:
generating a plurality of labels corresponding to the plurality of user-specific training images, wherein each of the plurality of labels identifies:
a location within the corresponding image where an object of the first set of images is located or wherein a variant of the object of the first set of images is located, and
the class identifier of the object.

8. The computer-implemented method of claim 4, further comprising:
receiving, from the electronic device of the user, a request to download the ML model; and
transmitting the ML model to the electronic device of the user.

9. The computer-implemented method of claim 4, wherein each of the first set of images depicts the corresponding object against a transparent, substantially monochromatic, or completely monochromatic background.

10. The computer-implemented method of claim 4, wherein at least one of the plurality of user-specific training images is based on two or more of the first set of images and one of the second set of images.

11. The computer-implemented method of claim 4, wherein training the ML model comprises:
running a plurality of ML model training jobs with a corresponding plurality of different hyperparameter combinations; and
selecting the ML model based on evaluating results of the plurality of ML model training jobs.

12. The computer-implemented method of claim 4, further comprising:
causing the ML model to be deployed within a provider network; and
configuring a web service endpoint of the provider network to cause inference requests received at the web service endpoint to be serviced using the deployed ML model.

13. The computer-implemented method of claim 12, further comprising:
receiving, at the web service endpoint from the electronic device of the user, a request to generate the plurality of user-specific training images; and
generating a plurality of jobs based on the request,
wherein the generating of the plurality of user-specific training images comprises executing the plurality of jobs by a plurality of worker agents at least partially in parallel.

14. A system comprising:
a storage service implemented by a first one or more electronic devices of a provider network; and
a machine learning service implemented by a second one or more electronic devices of the provider network, the machine learning service including instructions that upon execution cause the machine learning service to:
obtain, from an electronic device of a user, a first set of one or more images and a set of one or more class identifiers, each of the first set of images being associated with one identifier of the set of class identifiers that indicates a type of an object depicted within that image;
obtain, from the electronic device of the user, a second set of one or more images;
generate a plurality of user-specific training images, wherein each image of the plurality of user-specific training images is based on at least one image from the first set of images and at least one image from the second set of images;
store the plurality of user-specific training images to a location within the storage service; and
train a machine learning (ML) model using the plurality of user-specific training images as training data.

15. The system of claim 14, wherein to generate the plurality of user-specific training images, the instructions cause the machine learning service to:
overlay at least one object from the first set of images over a first image from the second set of images to yield a combined image.

16. The system of claim 15, wherein the instructions further cause the machine learning service to:
apply one or more filters or transformations to the combined image, the at least one object, or the first image.

17. The system of claim 14, wherein the instructions further cause the machine learning service to:
generate a plurality of labels corresponding to the plurality of user-specific training images, wherein each of the plurality of labels is to identify:
a location within the corresponding image where an object of the first set of images is located or wherein a variant of the object of the first set of images is located, and
the class identifier of the object.

18. The system of claim 14, wherein the generation of the plurality of user-specific training images is performed at least partially in parallel by a plurality of computing instances.

19. The system of claim 14, wherein the instructions further cause the machine learning service to:
cause the ML model to be deployed within the provider network; and
configure a web service endpoint of the provider network to cause inference requests received at the web service endpoint to be serviced using the deployed ML model.

20. The system of claim 14, wherein each of the first set of images depicts the corresponding object against a transparent, substantially monochromatic, or completely monochromatic background.

* * * * *